C. Webb,

Bee Hive.

No. 2,079.   Patented May 4, 1841.

Inventor.
Constant Webb

UNITED STATES PATENT OFFICE.

CONSTANT WEBB, OF WALLINGFORD, CONNECTICUT.

CONSTRUCTION OF BEEHIVES.

Specification of Letters Patent No. 2,079, dated May 4, 1841; Antedated March 12, 1841.

*To all whom it may concern:*

Be it known that I, CONSTANT WEBB, of Wallingford, in the county of New Haven and State of Connecticut, have invented a new and useful Improvement in the Construction of Beehives.

The nature and object of my improvement consists in suspending the hive upon an angle that will give to the bottom an inclined plane of 4 or 5 inches to the foot and in so constructing the bottom that it can be wholly removed, or closed tight as occasion may require and in the chamber for spare honey giving the bees easy communication between the drawers while working.

To enable others skilled in the art to make and use my invention and improvement I describe its construction and operation as follows, referring to the accompanying drawings as part of this specification, by which—

Figure 1:
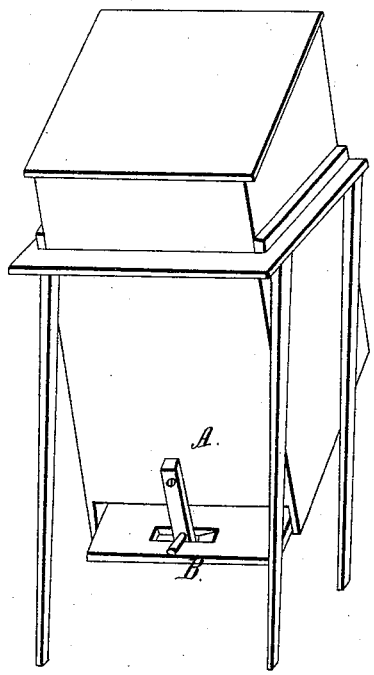
Figure 2:
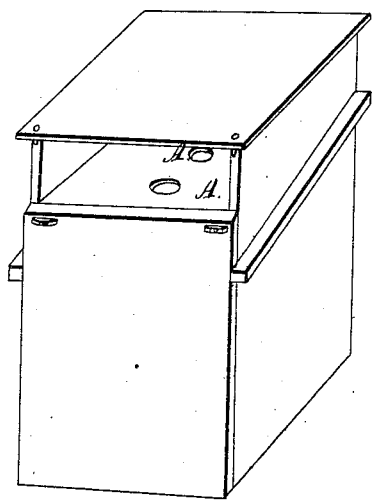
Figure 3:
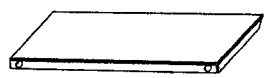
Figure 5:
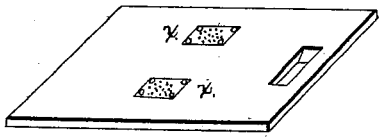
Figure 4:
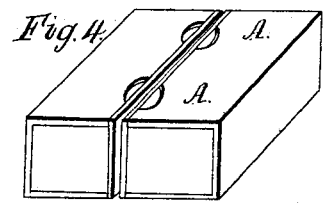

Figure 1 represents a front view of my improved beehive suspended in a frame. Fig. 2, exhibits the back side of the hive, the drawers being withdrawn from their chamber. Fig. 3, the door of the chamber. Fig. 4, the drawers. Fig. 5 the bottom of the hive.

My improved hive consists of a square box, about 20 inches high by 14 inches on the sides. On the top is a chamber for drawers in common form about 6 inches deep, (by means of which the surplus honey can be withdrawn) leaving the hive proper about 12 inches in the clear, having a bottom which I make and apply in the following manner. The front board of the hive I make about 3 inches shorter than the sides and back and the bottom of the hive is made to slide in and rest on cleats attached to the inside of the sides so that the opening left for the bees to pass into the hive when the bottom rests on the cleats is about ¾ of an inch. This bottom may be drawn out and replaced at pleasure and is held in place by a bolt or button, attached to the front of the hive and passing through the bottom as seen at G, and can be raised upon the bolt or button and held there by a pin as seen at H, which closes the hive so that no bees can escape. In the bottom board are two holes about an inch square as seen at X, covered with wire netting to ventilate the hive. The advantages of this movable bottom are that it can be wholly removed and the hive left standing firmly with free access for the bees when hiving and when the swarm have entered, the bottom can be replaced and the hive closed without shaking or disturbing the bees and can then be removed with greater ease and safety than by any other known hive. This bottom is also made to discharge moths, worms and all impure detached substances, by suspending the hive on cleats in a frame or otherwise, so as to make the bottom an inclined plane toward the front at the rate of 4 or 5 inches to the foot as seen Fig. 1, thereby also forming a shelter for the bees from rain and storms.

The drawers in the chamber have a communication with the body of the hive below by means of the corresponding orifices in the bottom of the chamber as seen in Fig. 2, A, A, and in the bottom of the drawers as seen Fig. 4 A, A. Both drawers thus opening into the hive, through the same orifice will give the bees access to both drawers at pleasure, and by proper slides one can be taken and the other left or both can be taken at the same time.

I do not claim as my improvement the movable bottom merely, nor the suspension of the hive for protection from the moth, both are common but, I do claim as my invention and improvement and as new and useful—the peculiar form of the construction of the hive by making the front board shorter than the sides and back, so that the bottom is made to slide in and rest on cleats attached to the inside of the sides, and can be wholly drawn out for the convenience of hiving bees, and when hived can be replaced and the hive closed without shaking it, or disturbing the bees, till the hive and its contents are safely removed to its proper station—all which I claim in combination with the mode of suspending the hive so as to make the bottom an inclined plane, while the top and body of the hive project forward to protect the bees from storms, &c.—all substantially in the manner specified above.

CONSTANT WEBB.

Witnesses:
EDGAR ATWATER,
HENRY PARKER.